Nov. 2, 1965     J. S. KURTZ ETAL     3,215,258
CONVEYOR BELT TENSIONING MEANS
Original Filed July 9, 1962          3 Sheets-Sheet 1

INVENTORS
JOHN S. KURTZ
JEWEL GRAVES
BY

ATTORNEYS

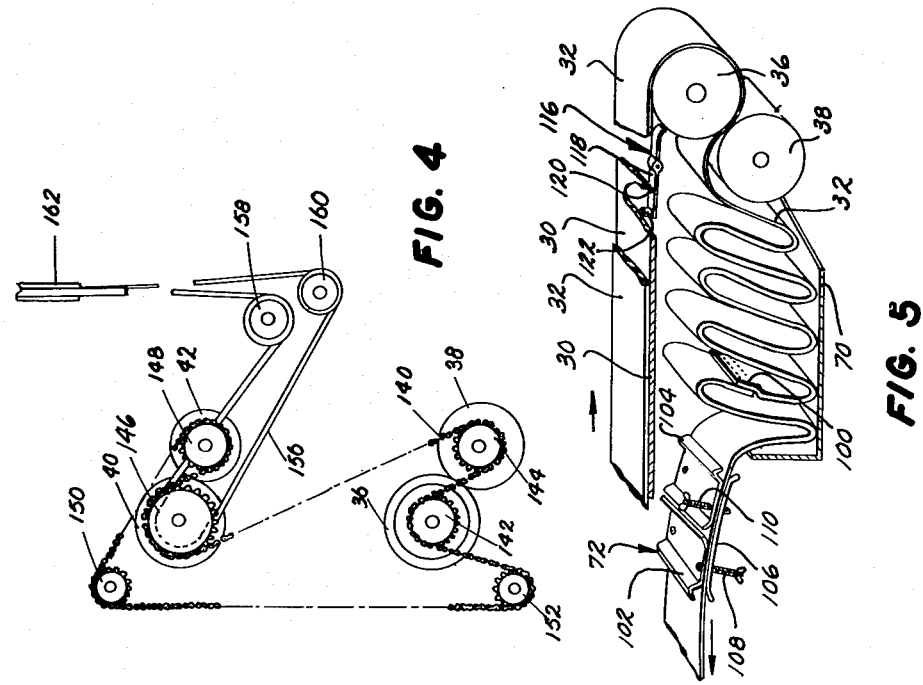
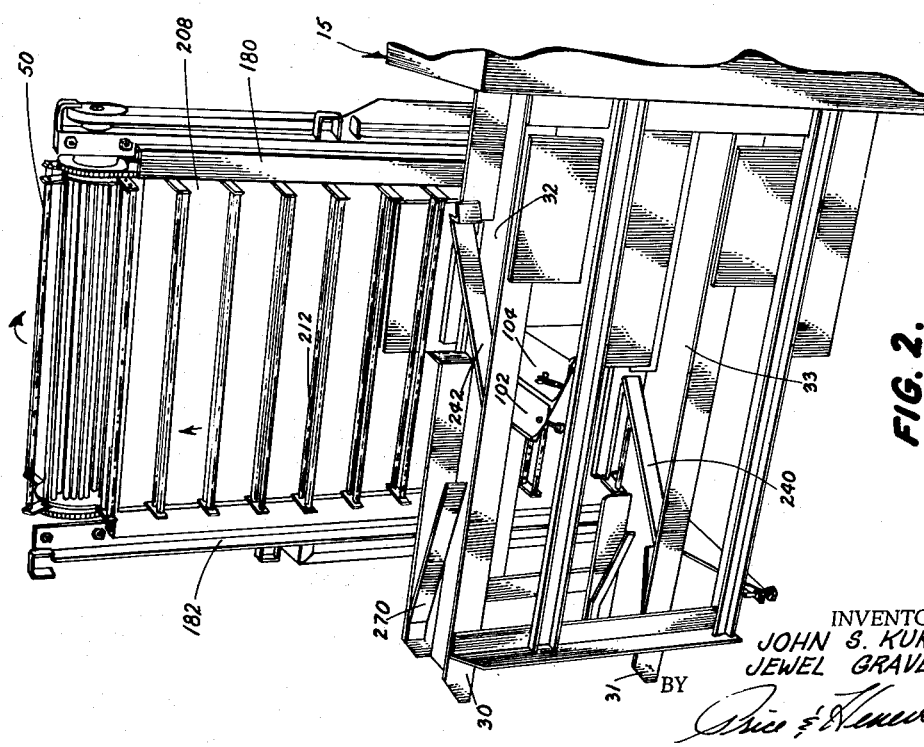

Nov. 2, 1965  J. S. KURTZ ETAL  3,215,258
CONVEYOR BELT TENSIONING MEANS
Original Filed July 9, 1962  3 Sheets-Sheet 3

INVENTORS
JOHN S. KURTZ
JEWEL GRAVES
BY
ATTORNEYS

United States Patent Office 3,215,258
Patented Nov. 2, 1965

3,215,258
CONVEYOR BELT TENSIONING MEANS
John S. Kurtz, Ephrata, Pa., and Jewel Graves, Holland, Mich., assignors to Big Dutchman, Inc., a corporation of Michigan
Original application July 9, 1962, Ser. No. 208,302. Divided and this application July 2, 1964, Ser. No. 384,279
4 Claims. (Cl. 198—208)

This is a division of application Serial No. 208,302, filed July 9, 1962.

This invention relates to conveyors, and more particularly to egg handling apparatus including belt conveyor and tensioning means therefor.

Poultry husbandry today involves a great deal of automation both in feeding and egg gathering. Optimum automation for egg gathering requires conveyor means adapted to transport eggs directly from the nests to a central gathering point. This can often involving transporting eggs from several different nest housings including hundreds of individual nests.

Further, since the egg transfer conveyor belt mechanism is preferably formed of a substance such as jute which provides excellent egg transfer characteristics, the belts are highly responsive to changing moisture conditions to stretch or contract large amounts. These belts can cause a great deal of egg breakage when they slacken and get wound around the power roller. Further, if a conventional tensioner element is used to hold the belt taut regardless of slack, the overlapping joined ends of the belt forming a thick juncture portion tend to cause the belt to jerk and snap through the tensioner, thereby upsetting the eggs and causing breakage.

It is an object of this invention to provide an egg conveyor belt control mechanism including a tensioning means which controls the proper tension of the belt, and also prevents thickened portions of the belt from jerking the belt to damage the eggs as these portions pass through the tensioner means.

These and many other objects of this invention will be apparent upon studying the following specification in conjunction with the drawings in which:

FIG. 2 is an enlarged perspective view of the elevator apparatus and adjacent conveyor means;

FIG. 4 is an elevational partially schematic view of the main driving mechanism for the conveyor and elevator;

FIG. 5 is a fragmentary perspective view of the power roller means of the egg conveyor mechanism and the belt control and safety apparatus therefor;

Figure 1:
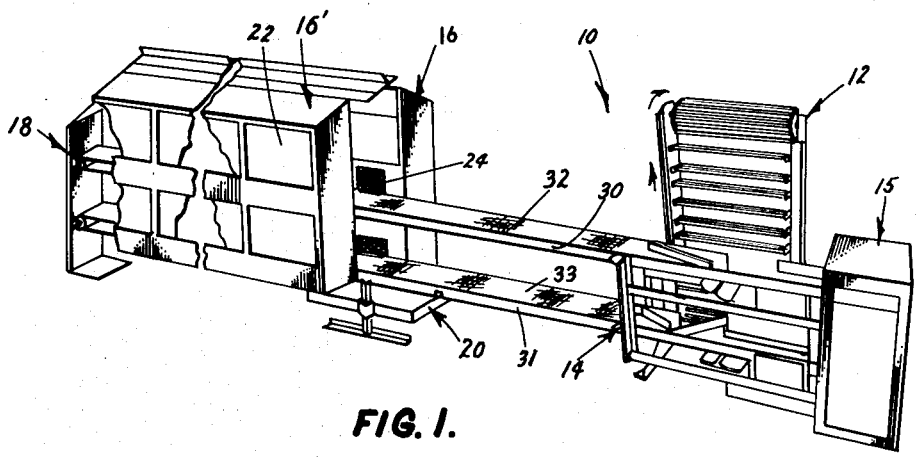
FIG. 1 is a perspective view of a typical nest housing having the conveyor means and elevator means of this invention.
Figure 3:
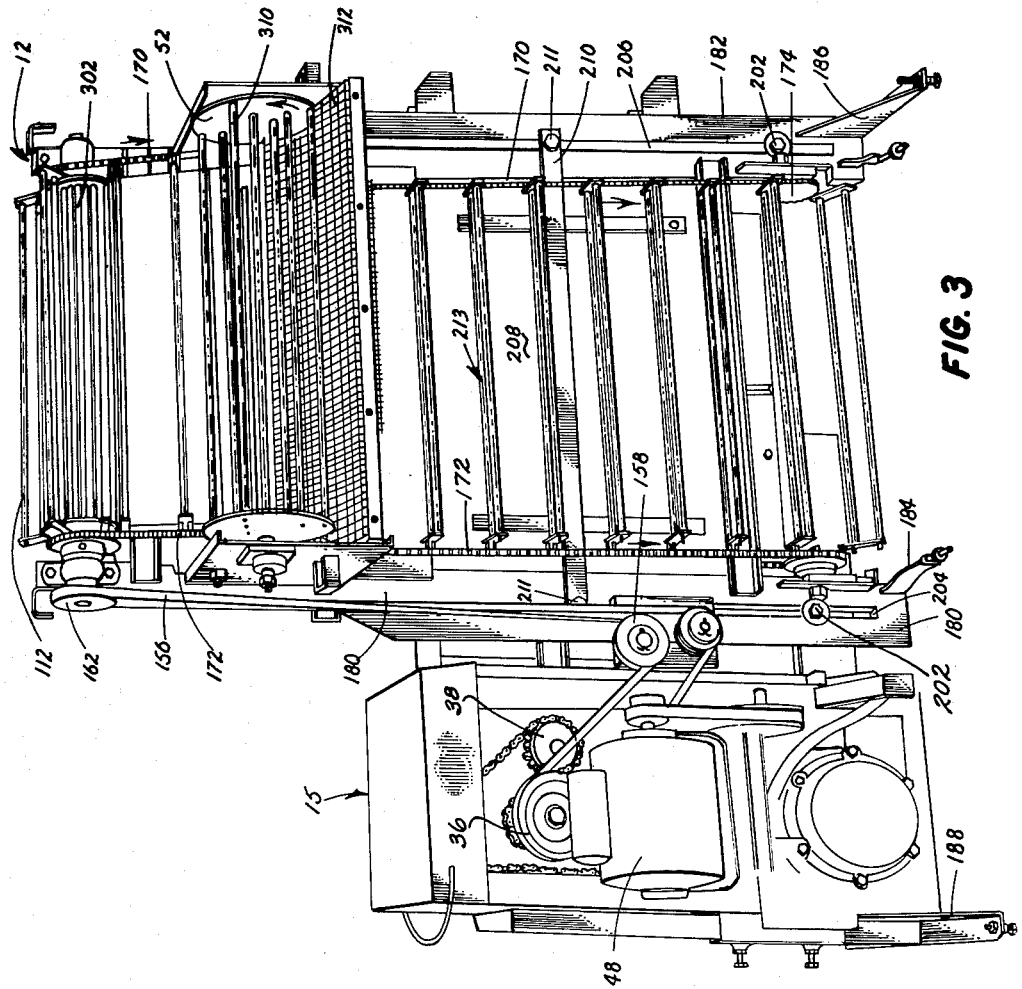
FIG. 3 is an enlarged perspective view of the novel elevator apparatus viewed from the opposite side of that side illustrated in FIGS. 1 and 2 and showing apparatus for transferring from the elevator.
Figure 6:
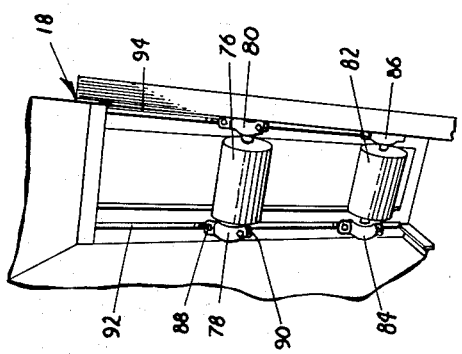
FIG. 6 is a fragmentary perspective view of the idler roller device of the conveyor means.
Figure 7:
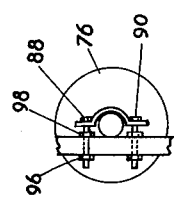
FIG. 7 is a fragmentary end elevational view of one of the idler rollers of FIG. 6.

Basically, the egg handling apparatus comprises an egg conveyor means and inter-related egg elevator and transfer device. The egg elevator has a plurality of egg carrying flights mounted to move in an endless manner up one side, crossing over at the top, and down the other side. The conveyor means is adjustably mounted with respect to the elevator to feed eggs in a controlled manner onto the up-moving side of the elevator. The elevator includes a unique egg transfer control means allowing egg transfer from the conveyor means to the flights, preferably pairs of bars forming elongated pockets, only when the flights are substantially aligned with the particular conveyor level concerned. The eggs are also gently crossed over at the top of the elevator from their support position on one side of a flight to a position on the opposite side of an adjacent flight to pass down the other side. An egg removal or transfer apparatus from the elevator moves eggs generally on an asymtotic curve onto a horizontal support surface in a gentle but positive manner.

The egg conveyor belt includes a belt tension control composed of at least two tensioning members whereby the tensioning members alternate in control of the belt to prevent it from jerking when one of the tensioning members is disrupted with passage of thickened joined portions of the belt. The belt further is prevented from tangling around the power rollers to cause egg breakage, by a safety switch pivoting member adapted to shut down the equipment.

Other features of the invention will be readily apparent from the detailed description. Referring to the drawings, the novel egg handling and transfer apparatus 10 includes egg elevator 12 and conveyor means 14 shown as including upper and lower levels. The conveyor is shown associated with a pair of back-to-back nest housings 16 and 16' between which the conveyor means is mounted for cooperation with both. Idler mechanism 18 at the far end reverses the direction of the two belts shown, or any number of belts as desired.

The nest housings 16 and 16', as well as the conveyor mechanism between the houses may be supported on an adjustable stand means 20 such as that disclosed more specifically in copending application Serial No. 208,297, filed July 9, 1962 entitled Nest Support, now U.S. Patent No. 3,124,102. The individual nests 22 each include an egg roll-out opening 24 in the back cooperative with the conveyor mechanism to transfer laid eggs unto the particular conveyor level concerned. The conveyor can include a plurality of levels, here shown for convenience to be two. Each level may include a metallic support 30 with a belt 32 traveling therover. Each belt is preferably formed of a material such as jute and is driven by a pair of adjacent power rollers, e.g. 36 and 38 for upper belt 32, and power rollers 40 and 42 for lower belt 33 on lower support 31. The power rollers may be driven by suitable motor means, such as electrical motor 48, here shown as part of power drive mechanism 15 in a suitable housing.

In order to understand the detailed description of the apparatus more clearly, it should be realized that each of the two levels of the conveyor shown operates independently of each other in transferring eggs from one level of the nest housings, to the elevator apparatus 12 where the eggs are transferred from the individual conveyor levels to the single elevator. The eggs are carried up one side of the elevator (as illustrated in FIGS. 1 and 2), crossed over at the top by cross-over member 50, lowered down the opposite side of the elevator on the back side of individual flights of the elevator, and then transferred by rotating spider unloader member 52 unto horizontal egg receiving surface 54. Surface 54 may comprise a table, a conveyor belt or any other suitable receiving surface as the situation requires.

Each of the belts is drawn across their elongated support surface by their respective pair of power rollers, passes into a slack bin 70, passes through the novel tensioning means 72, and then returns to the other end of the nest housings 16 and 16', to go around idler rollers of idler mechanism 18.

Upper idler roller 76, accommodating upper belt 32, is mounted in a pair of bearings 78 and 80, while lower idler roller 82, accommodating lower belt 33, is mounted between a similar pair of bearings 84 and 86. Each of the bearings includes a pair of studs 88 and 90 which extend through vertical slots 92 and 94 of the idler support 18 to provide vertical adjustment of the rollers. Also, each of the roller studs includes a pair of lock nuts 96 and 98 to enable the ends of each roller to be adjusted toward or away from the support stand. Thus, the idler rollers have practically universal adjustment due to these features.

The tensioning means 72 of the belt must be capable of controlling the tension of the belt while also preventing the belt from jerking or jumping when thickened portion 100 forming the sewn junction of the ends of the now endless belt passes through. In other words, as thickened portion 100 contacts the plate, it stops briefly. After considerable stretching of the belt and considerable force is exerted on the belt, portion 100 rapidly passes between the plates, causing them to open up wide against the bias of their compressing springs. The belt has a tendency to snap through with a jerk. With prior art tensioners, this tends to throw the eggs about on the conveyor and cause breakage. Applicant's novel tensioning apparatus 72 overcomes this. It includes at least two upper members 102 and 104 biased against common lower plate 106 by compression springs 108 and 110. If desired, instead of one lower plate 106, two plates may be substituted. The device assures positive control in a non-jerking fashion of the belt, since when thickened portion 100 lifts and passes underneath first plate 104 to disrupt its regular action, the second plate 102 maintains control over the belt to prevent it from jerking the egg carrying part of the belt. While the thickened portion passes beneath the second plate, the first plate maintains control over the belt. Thus, jerking of the belt is eliminated.

The belt mechanism of the egg transfer apparatus includes still another safety feature to forestall egg breakage. The slack belt passing through power rollers 36 and 38 are prevented from winding up on roller 36 to thus jam the apparatus and throw eggs about. This is done with novel safety release means 116 which includes a pivotal lever or plate 118 having its foremost surface adjacent the periphery of roller 36, and being spring biased toward the emerging belt 32 from between the power rollers. This bias is achieved preferably by a tension spring 120 between belt support 30 and the lever 118 on the opposite side of its pivotal mounting axis. A micro-switch 122 is normally pressed against the under surface of belt support 30 or against any other surface by this biased action, to hold the switch normally closed. The switch controls power to the conveyor driving motor 48. If belt 32 emerging from the rollers 36 and 38 starts to wind around the roller 36, it bunches against the foremost surface of the lever 118 causing pressure on it to pivot it against its spring bias 120. This moves microswitch 122 away from surface 30 to open the switch and shut-off electrical power to motor 48, which thereby shuts down the entire mechanism to prevent further damage until the situation is rectified. The foremost edge of bin 70 is positioned adjacent lower roller 38 to prevent any slack from winding around it.

Motor 48 drives the conveyor belts by driving rollers 36, 38, 40 and 42 through chains 140, sprockets 142, 144, 146, 148 and idler sprockets 150 and 152. It also drives the elevator apparatus through belt 156 driven by sprocket 146 and passing around idler sheaves 158 and 160 to sheave 162 operably mounted to the cross-over member 50 of the elevator.

The elevator mechanism includes a pair of endless chains 170 and 172 which pass around sprockets on the axle of the top cross-over member 50, and around sprockets 174 at the bottom of the elevator. The elevator 12 is supported by a pair of end positioned, spaced, uprights 180 and 182 having feet 184 and 186. Power means 15 is preferably integrally attached to these vertical supports and includes a third foot 188.

The elevator bars are supported by end plates 216 and 218, which are affixed to conveyor chains 170 and 172. Each of the flights 213 passes successively past the two conveyor levels to receive eggs therefrom. The eggs are deflected from the conveyors by respective diagonal reflecting members 240 and 242 under which the belts travel. The lower deflecting member 240 is adapted to rolls eggs unto the first half of the flights, while the upper diagonal deflecting member 242 is positioned to roll eggs unto the second half of the conveyor flights. If three or more conveyor levels are used, the elongated pockets defined by bars 212 will be divided into three or more sections rather than two as illustrated. This division of the flight prevents eggs from an upper level from rolling onto another egg from a lower level causing breakage. If desired, a central dividing member 250 (FIG. 4) may also be utilized to prevent any eggs from rolling from the first half of the conveyor to the second half.

Since the conveyor mechanism may be adjusted with respect to the vertical uprights of the elevator, a control means is provided to prevent eggs from rolling off the conveyor unto the elevator flights when the flights are several inches below the level of the conveyor. In other words, as the individual flights of the elevator rise and approach the level of each conveyor, the eggs must be allowed to roll off the conveyor only when the flight is practically aligned with it. Therefore, a pivotal control means 250 is provided for the lower conveyor, and means 252 is provided for the upper conveyor. Each of these control means essentially comprises a U-shaped element formed of a pair of short end legs 254 and a long crossbar 256. Each of the end legs is pivotally mounted to panel 208 of the elevator.

Cross-over member 50 includes a pair of circular end discs 300 between which are mounted a plurality of rods 302, preferably coated with a cushion material such as rubber. In fact, it is preferable to coat all the rods of this apparatus with a cushion material such as rubber, plastic or the like. These rods 302 are placed to generally form a star, shown to have four points in the form of the invention illustrated, with concave recesses between the points of the star. The discs and rods rotate as driven by belt 156 in synchronism with movement of conveyor chains 170 and 172 around their endless path. The flights of the elevator are caused to coincide with the points of the star as the flights pass around the cross-over. Eggs positioned on one side of the flights gently roll through the concave recesses between the points of the star as the endless chain and flights move over the topmost part of their endless path, and come to rest on the opposite side of the adjacent flight. As the flights continue down, conveyor chains 170 and 172 move down and around special sprockets 304 and 306 which cause the flights to tilt and discharge eggs thereon.

In order to provide a positive, gentle discharge of the eggs from these flights to support surface 54, a special spider wheel 52 or discharge mechanism is utilized. This includes a pair of circular end discs adapted to rotate, and having mounted therebetween a plurality of bars 310. These bars are mounted in groups to form radially extending support means or wings having generally concave elongated pockets formed by a group of three bars. As the mechanism rotates counterclockwise, and each wing approaches the individual flights of the conveyor, the bars receive the egg, e.g. 14', and gently lower it along an asymtotic curve between the flight and the support surface 54. This curve includes a lower support surface 312 which may comprise a plastic coated wire mesh. The eggs are assured of a gentle discharge from the elevator due to the slowly revolving spider 52. Also, no eggs are allowed to hang up on the discharge, since they are gently brushed unto the surface 54 if they tend to stop in their movement. A collection or discharge surface may comprise a table 54 mounted to vertical uprights 180 and 182 of the elevator mechanism. It should be realized that this discharge surface may be a counting table, a washing mechanism, another conveyor belt, or any other suitable surface.

Operation

Eggs laid by chickens or other fowl in nest housings 16 and 16' roll out the respective rear openings 24 of the individual nests 22 and unto either conveyor belt 32 or conveyor belt 33 depending upon the particular nest involved. The diagonal surface 242 causes the eggs to roll laterally for loading onto the elevator flights 213. The eggs are prevented from rolling onto the flights when the flight bars are substantially below the height of the conveyors, by timer or control elements 250 and 252. As each individual flight of the conveyor moves upwardly and pivots the respective control element out of the way, the individual eggs are allowed to roll unto the conveyor bars. They are carried upwardly and shifted from one side of the individual flights to the opposite side of the adjacent flight by star wheel or cross-over 50, at the top of the conveyor. The eggs are then carried downwardly where they are tilted off the individual flights and are removed in a smooth fashion by rotating spider wheel 52 which guides them unto surface 54. Driving action of the conveyor as well as the elevator is achieved through the chain and belt elements. Control is obtained over the two respective conveyor belts 31 and 32 by tension control means 72 and safety shut-off means 116. The eggs are thus assured of a gentle, non-jerking passage from the nest to the gathering surface 54.

Various other advantages, not heretofore enumerated, but obvious from the illustrated form of the invention and the principles taught will occur to those in the art. Also, various other obvious modifications of the apparatus may occur to those in the art to suit a particular situation. These obvious modifications are deemed to be part of this invention if within the principles taught, since this invention is intended to be limited only by the scope of the appended claims, and the reasonably equivalent structures to those defined therein.

We claim:
1. An egg conveyor belt control mechanism for a belt having excess slackness and a thickened end-to-end attachment to form an endless belt comprising: roller means and belt drive means; a slack receiving means; a belt around said roller means and having slack in said receiving means; and belt tensioning means operably between said receiving means and said drive means with respect to conveyor belt movement, and including at least two adjacent compressing means adapted to pass portions of said belt therebetween, whereby as said thickened attachment spreads and disrupts one of said compressing means, the other compressing means maintains proper tension on said belt and vice versa.

2. A conveyor belt and control mechanism comprising: a belt having a thickened end-to-end attachment to form an endless member; support surface means for said belt over which said belt conveys, and under which said belt returns in endless fashion; said belt having excess slackness with respect to said support means; belt guide and control rollers at the ends of said support surface means; belt-drive means to pull said belt across said surface means for conveying; and belt tensioning means under said support means including at least two adjacent compressing means adapted to pass portions of said belt therebetween, whereby as the thickened end-to-end attachment spreads and disrupts one of said compressing means, the other compressing means maintains proper tension on said belt and vice versa.

3. A conveyor belt tension control mechanism for a flexible recirculating belt having excess slackness and a thickened end-to-end attachment to form an endless belt, comprising: roller means and belt pulling drive means; slack receiving means; a belt around said roller means and having slack in said receiving means; and belt tensioning means operably between said receiving means and said drive means, with respect to conveyor belt movement, including at least two adjacent belt compressing means; each of said compressing means comprising two elements biased together to apply restraint on said belt as they pass portions of said belt therebetween, and temporarily shiftable against the bias to pass the thickened belt portion, whereby as the thickened attachment temporarily spreads one of said compressing means, the other maintains proper tension on said belt, and vice versa.

4. The mechanism in claim 3 wherein said elements are plates straddling the belt and biased together by spring means, said plates being flared along the edge to form a belt receiving mouth for belt passage.

References Cited by the Examiner
UNITED STATES PATENTS

| | | | |
|---|---|---|---|
| 661,242 | 11/00 | Flood | 198—208 X |
| 2,909,274 | 10/09 | Koeske | 198—208 |

SAMUEL F. COLEMAN, *Primary Examiner.*

WILLIAM B. LA BORDE, *Examiner.*